United States Patent [19]

Rauchhaus

[11] Patent Number: 4,781,407
[45] Date of Patent: Nov. 1, 1988

[54] LATCH MECHANISM FOR THE GLOVE COMPARTMENT COVER OF A VEHICLE

[75] Inventor: Martin Rauchhaus, Dreieich-Sprendlingen, Fed. Rep. of Germany

[73] Assignee: General Motors Corporation, Detroit, Mich.

[21] Appl. No.: 37,579

[22] Filed: Apr. 13, 1987

[30] Foreign Application Priority Data

May 13, 1986 [DE] Fed. Rep. of Germany ....... 3616020

[51] Int. Cl.[4] .............................................. E05C 9/14
[52] U.S. Cl. ........................................ 292/37; 292/34; 292/169.11
[58] Field of Search .............. 292/37, 34, 169, 169.11, 292/165, 40, 143

[56] References Cited

U.S. PATENT DOCUMENTS

| 609,416 | 8/1898 | Damon | 292/37 |
|---|---|---|---|
| 1,155,617 | 10/1915 | Reichard | 292/37 |
| 1,427,253 | 8/1922 | Appleby | 292/37 X |
| 1,798,170 | 3/1931 | Roedding | 292/165 X |
| 1,840,252 | 1/1932 | Reinhart | 292/169 X |
| 2,136,854 | 11/1938 | Knott | 292/169.11 |
| 3,498,657 | 3/1970 | Fontana | 292/34 |
| 4,099,753 | 7/1978 | Gwozoz et al. | 292/34 X |
| 4,648,638 | 3/1987 | McKnight | 292/165 X |

FOREIGN PATENT DOCUMENTS 175182 6/1953 Fed. Rep. of Germany ........ 292/34
2852309 4/1980 Fed. Rep. of Germany .
3230865 5/1985 Fed. Rep. of Germany .

Primary Examiner—Gary L. Smith
Assistant Examiner—Curtis B. Brueske
Attorney, Agent, or Firm—Charles E. Leahy

[57] ABSTRACT

A latch mechanism for the hingedly mounted glove compartment cover of a vehicle glove compartment includes a pair of latching members reciprocably mounted in the glove compartment cover and having a locking rod at the outer end thereof adapted for introduction into a recess in the glove compartment to latch the door in the closed position. Each latching member has at the inner end thereof a cylindrical surface with a right-angled triangular shaped groove having walls which are perpendicular to each other respectively arranged parallel and perpendicular to the longitudinal axis of the locking rod and the wall perpendicular to the longitudinal axis of the locking rod located toward the outer end of the locking rod. A handle is pivotable about a bearing axis disposed on the cover and in parallel relationship with the pivot axis of the cover. The handle has a pair of transmission elements which extend respectively into the triangular grooves of the latching members whereby pivotal movement of the handle causes the transmission elements to be displaced in a path perpendicular to the axis of the locking members so that the transmission elements coact with the walls of the grooves to translate the latching members in and out of the recesses of the glove compartment.

3 Claims, 4 Drawing Sheets

LATCH MECHANISM FOR THE GLOVE COMPARTMENT COVER OF A VEHICLE

The present invention pertains to a latch mechanism for the glove compartment cover of a vehicle, and more particularly to a latch in which pivotal movement of a handle retracts reciprocable latching members, with an actuator for releasing the latch.

BACKGROUND OF THE INVENTION

In such a latch mechanism known from DE-PS No. 32 30 865, which comprises a locking cylinder for additional locking of the glove compartment, the actuator is constructed as a pivot handle which is pivotable about a bearing axis disposed in the cover. The bearing axis is parallel to the bearing axis of the cover and is located in the region of the edge of the cover turned away from the bearing axis of the cover. On its rear side the pivot handle has a latching member consisting of a plurality of parts, which actuates a single lock disposed in the region of the said edge. Thus, a lever is disposed on the rear side of the pivot handle, which said lever cooperates with the stop of a rotatable and slidable rod so that the said rod performs a rotary movement during the pivot movement of the pivot handle against the force of a spring. In addition to this rotary movement, the rod can also be displaced in the direction of its longitudinal axis. The lock cylinder is linked for this purpose with a pinion segment which meshes with a pitchless dividing worm which is made in one piece with the said rod. The lock located in the middle of the glove compartment cover has a hook bolt; in its open position, this is moved by a lever provided on the rod, which said lever pushes the hook bolt during the pivot movement of the pivot handle if the position of the lock cylinder is not secured. If the lock cylinder is in its secured position, the rod had been moved in the axial direction, and the lever will not push the hook bolt during the rotation of the rod, so that it will be impossible to open the glove compartment cover A latch mechanism for a glove compartment cover of a motor vehicle is described in DE-OS No. 28 52 309, in which a single lock is centrally disposed relative to the longitudinal extension of the cover, whereas the actuator is disposed on the side of the cover belonging to the center of the vehicle It is the task of the present invention to create a latch mechanism of the said type, which is of simple design and can be used universally, be it for latching a cover in the region or one or both of the front sides or one or both of the long sides of the cover.

SUMMARY OF THE INVENTION

This task is accomplished by the actuator being constructed as a pivot handle which is pivotable about a bearing axis disposed in the cover, that the latching member has a locking rod that can be introduced into a recess in the glove compartment with a first transmission element disposed in the region of the pivot handle, which said transmission element is connected with the said locking rod, and with a second transmission element connected with the pivot handle, the two transmission elements being connected to each other in a form-locking relationship so that a pivot movement of the pivot handle results in a rectilinear movement of the locking rod essentially parallel to the bearing axis of the pivot handle.

The solution according to the present invention has created a latch mechanism in which all the movements which are required for latching and releasing the glove compartment cover are transformed in the region of the pivot handle, and the mechanism consists of a small number of components and is of compact design. This makes it possible to impart a simpler design not only to the latch mechanism as such, but also the glove compartment cover, because it is not necessary to dispose complicated components in a region remote from the pivot handle on or in the glove compartment cover. Due to the direct transformation of the movements in the region of the pivot handle, i.e., the transformation of the rotary movement of the pivot handle into the rectilinear movement of the locking rod and the especially simple design of the latching member in the form of the locking rod, the latch mechanism can be universally used, e.g., by disposing the bearing axes of the pivot handle and of the locking rod essentially parallel to the bearing axis of the glove compartment cover and by the locking rod entering through one front side of the cover or by the bearing axes extending perpendicular to the bearing axis of the glove compartment cover and the locking rod being led through a longitudinal side.

Due to the form-locking arrangement of the two transmission elements, the rotary movement of the pivot handle is directly transformed into the rectilinear movement of the locking rod. The transmission elements perform a relative movement, and due to the first transmission element being pushed by the second transmission element in a form-locking relationship during the pivot movement of the pivot handle in one direction, the first transmission element is moved away from the recess. According to a special embodiment of the present invention, the first transmission element is constructed as a cylinder exclusively movable in the axial direction, one of the circular surfaces of which is connected with the locking rod and whose wall surface has a groove, at least one edge of the groove remote from the locking rod forming an angle with the longitudinal axis of the locking rod, and the second transmission element is constructed as a pin which engages in the groove Actuation of the pivot handle leads to a movement of the pin in one plane which is perpendicular to the bearing axis of the pivot handle, whereas the groove intersects this plane at an angle such that during the pivoting stroke of the pivot handle the pin slides past the edge of the groove remote from the locking rod, while causing a rectilinear movement of the cylinder, so that the locking rod connected with the cylinder is moved out of the recess in the glove compartment. The present invention is not limited to the embodiment shown.

It is also imaginable that the relative movement between the two transmission elements can be brought about in another manner, e g., by disposing the inclined surface on the pivot lever and the locking rod having a projection which is connected with the inclined surface in a form-locking relationship In principle, it can be considered sufficient if the groove is designed as an elongated groove of constant cross section However, the angled developed wall surface of the groove advantageously has the form of a right-angled triangle whose sides are parallel and perpendicular, respectively, to the longitudinal axis of the locking rod and the right angle is located in the region of the cylinder which is adjacent to the circular surface engaged by the locking rod This special design of the groove guarantees that when the cover is snapped in place, which causes the locking rod to be pushed back into the cover, the actuating handle is not moved by the cylinder According to a special embodiment of the present invention, two latching members which are movable in line with each other are provided, with two additional transmission elements for actuating two first transmission elements. In the transmission element being constructed in the form of cylinders, the two cylinders are preferably spaced apart from each other, with at least one compression spring located between them and engaging the other opposed circular surfaces of the cylinders. The cylinders are moved towards each other against the force of the spring due to the pivot movement of the pivot handle during the release of the locking rods, the spring pushes the cylinders apart from each other when the pivot handle is released, the spring brings the locking rods into their latched position and swings back the pivot handle.

To lock the glove compartment, a lock member may be provided which—when the locking rod is extended into the recess in the glove compartment or the locking rods are extended into the recesses—can be brought into contact with the other circular surface or circular surfaces of the cylinder or cylinders, respectively, thereby preventing the cylinder from moving away from the recess or the cylinders from moving toward each other. Aside from this, locking of the glove compartment can also be achieved by locking of one or both of the locking rods, by locking the actuator or by means of a lock member disposed separately.

Furthermore, the task is accomplished by the latching member containing an integral, flexible rhomboid body, wherein two locking rods are attached to the outside of the body in the region of opposed wedges and can be introduced into recesses in the glove compartment, opposed wedge portions of the body are joined to a first transmission means and the actuator comprises a slidable second transmission means essentially arranged perpendicular to the direction of the corresponding first transmission means, wherein the two transmission means are connected with each other in a form-locking relationship so that a rectilinear movement of the actuator results in a rectilinear movement of the locking rods.

Due to the elastic body being constructed as a rhomboid with locking rods disposed on opposed wedge portions, the movement of the two locking rods towards each other for unlatching can be brought about by a mechanically extremely simple cooperation of the two corresponding transmission means, while the two other wedge portions, which are disposed between the said wedge portions, and which also oppose each other, are moved away from each other. This can be achieved, e.g., by pushing a pin acting as the second transmission means against an inclined surface of the first transmission means by means of the actuator, whereby the said first transmission means will yield in the above-mentioned direction of movement, thereby moving the locking rod. The inclined surface may be arranged directly at the locking rod, whereby part of the locking rod represents the first transmission means, but the first transmission means may also be arranged separately at the rhomboid body. According to a special embodiment, the other two opposed wedge portions of the body are connected with the first transmission means which are directed inwardly towards each other with their adjacent ends spaced apart from each other, and the first transmission means converge conically towards each other and have inclined surfaces extending in the direction of the second transmission means, and the second transmission means have surfaces which extend parallel and come into contact with the inclined surfaces. A lock member may be provided in this embodiment as well; the said lock member can advantageously be disposed between the rhomboid bodies such that opposed wedge portions of the rhomboid are unable to be moved towards each other.

Further details, characteristics and advantages of the present invention will become apparent from the subclaims as well as from the following description of two embodiments on the basis of the drawings.

DESCRIPTION OF THE PREFERRED EMBODIMENT

Figure 1:
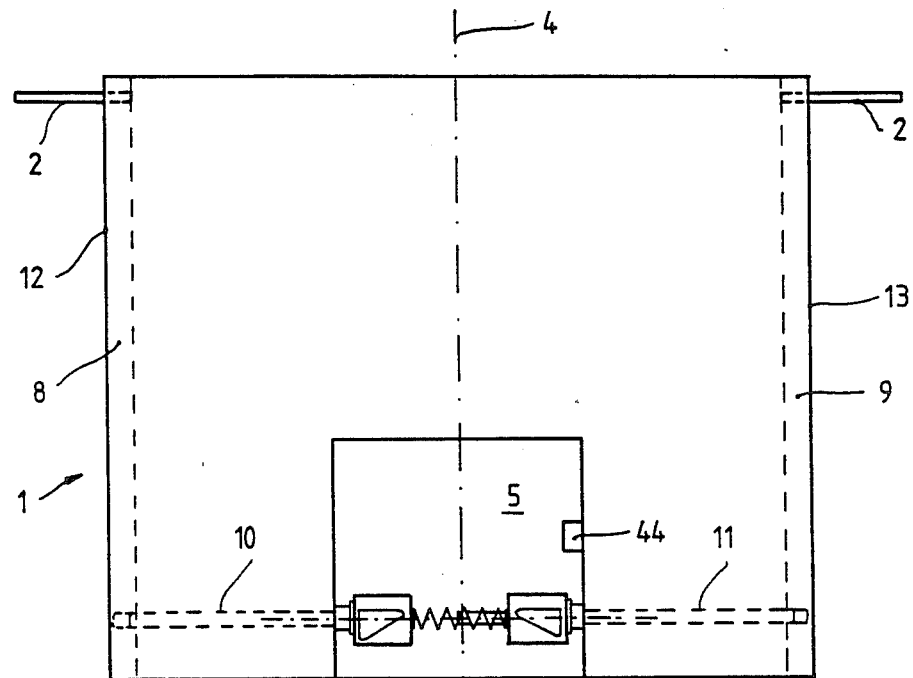
FIG. 1 shows an external view of a glove compartment cover with a first embodiment of the latch mechanism according to the present invention with the pivot handle, tilted into the plane of the drawing, removed.
Figure 1:
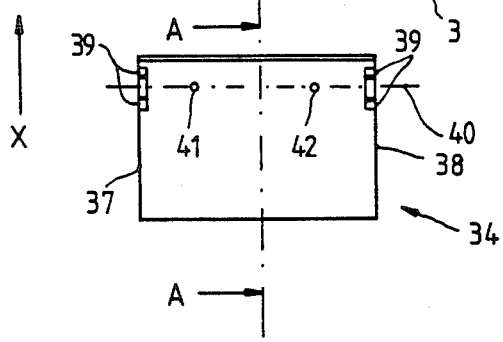

The glove compartment cover 1 shown in FIGS. 1 through 5 has bearing pins 2 disposed in line on two opposed sides for holding the glove compartment cover 1 in the glove compartment which is not shown in detail. The glove compartment cover 1 is constructed as a flat hollow body and, as is especially apparent from the representation in FIG. 3, it is bent between the bearing pins 2 and the front edge 3 of the glove compartment cover 1, which said front edge opposes the said bearing pins. In the region of the front edge 3 and symmetrical to the center line 4, the cover 1 has an approximately square recess 5 in which the essential elements of the latch mechanism are arranged In the region of the recess 5, the inside 6 of the cover 1, i.e., the side which faces the interior space of the glove compartment when the cover is closed, has an arch 7 directed toward the interior space of the glove compartment, which serves, in addition to the recess 5, to receive the parts of the latch mechanism. In the region of the inside 6, the sides of the cover 1 which extend perpendicular to the front edge 3 have pro]projections 8 and 9, which, when the glove compartment is closed, come into contact with projections of the glove compartment which are not shown in detail Two locking rods 10 and 11 are guided in the cover 1 parallel to and adjacent to the front edge 3. The length of the locking rods is selected to be such that each locking rod reaches only slightly into the recess 5, on the one hand, and that it reaches almost to the outer edges 12 and 13 of the cover 1, on the other hand. The edge of each locking rod at the outer edge has an inclined surface 14 turned toward the inside 6, the locking rods are axially movable in the cover 1, and means not shown in detail prevent the locking rods from rotating The respective parts 15 and 16 of the respective locking rods 10 and 11, which said parts reach into the recess 5, have circular cross sections, the respective parts 15 and 16 are inserted into a respective recess 17 and 18 of a respective cylinder 19 and 20 and are nonrotatably connected by means of a bolt 21. Examined in detail, the respective locking rods 10 and 11 are reciprocable parallel to the bearing pins 2 of the cover 1, the respective locking rods 10 and 11 pass through the wall surfaces 22 of the respective cylinders 18 and 19, the wall surfaces 23 of the respective cylinders 19 and 20 have a groove 24 which has the shape of a right-angled triangle whose respective sides 25 and 26 are parallel and perpendicular, respectively, to the longitudinal axis of the respective locking rods 10 and 11, and the right angle is located in the region of the respective cylinders 19 and 20, which is adjacent to the circular surface 22. The two respective cylinders 19 and 20 are symmetrical relative to the center line 4 A compression spring 28 is disposed between the circular surfaces 27 of the cylinders 19 and 20, which said circular surfaces face each other, a guide pin 29, which is connected with the circular surface 27 of the cylinder 20 and is concentrical to the center line of the said cylinder, is disposed within the turns of the compression spring 28, and it extends approximately over a length which is slightly shorter than half the mutual distance between the cylinders 19 and 20 in the relaxed state of the compression spring 28.

Figure 2:
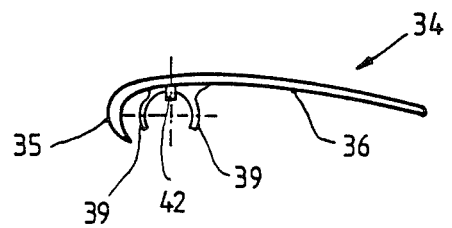
FIG. 2 shows a section through the pivot handle according to line A—A in FIG. 1 on an enlarged scale.
Figure 3:
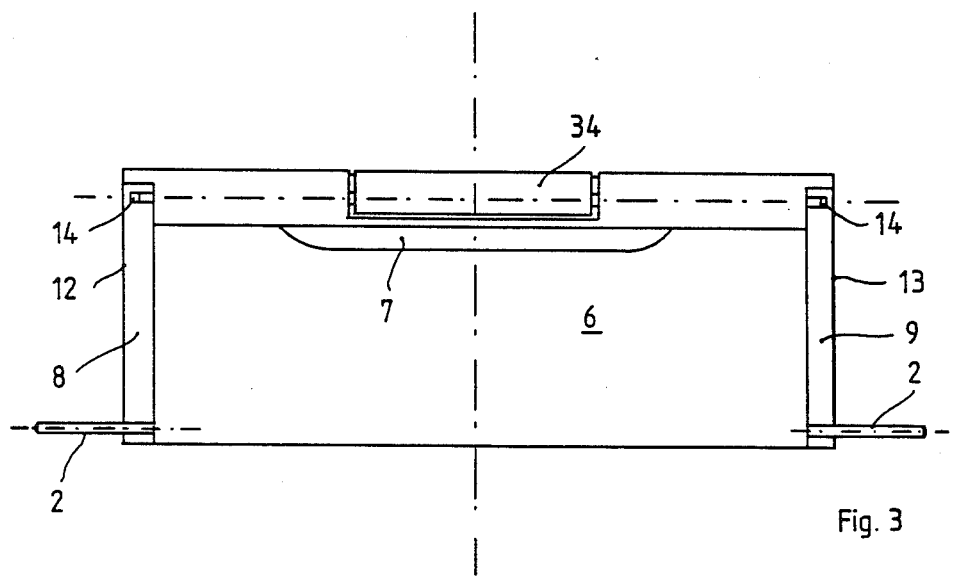
FIG. 3 shows a view of the glove compartment cover according to view x in FIG. 1.

A respective bearing bush 31 and 32 is disposed between the respective cylinders 19 and 20 and the corresponding lateral edge 30 of the recess 5, through which said bushes extend the respective locking rods 10 and 11. These bushes are slidable on the respective locking rods 10 and 11. They have a flange 33 adjacent to the respective cylinders 19 and 20, which said flange fixes the bearing bushes axially between the edges 30. The pivot handle 34 shown in FIGS. 1 through 3 is mounted on the bearing bushes 31 and 32. The pivot handle usually closes off the recess 5 shown in FIG. 1 To illustrate the latch mechanism, the pivot handle 34 was removed from the bearing bushes 31 and 32 in FIG. 1 and rotated by 180° into the position shown in FIG. 1.

The pivot handle 34 is essentially constructed in a rectangular shape. In the region of the sides 37 and 38 of the pivot handle 34, the inside 36 which faces toward the recess 5 in the mounted states of the pivot handle 34 has holding cheeks 39 whose spacing corresponds to the distance between the bearing bushes 31 and whose inside diameter corresponds to the outside diameter of the bearing bushes. The holding cheeks 39 surround the bearing bushes 31 and 32 over an angle which is greater than 180°. Since the holding cheeks are elastic, they can be placed on the bearing bushes and are safely held by them. The front side 35 of the pivot handle 34, which is in line with the front edge 3 of the cover 1 in the mounted state of the pivot handle, is arc-shaped.

Figure 4:
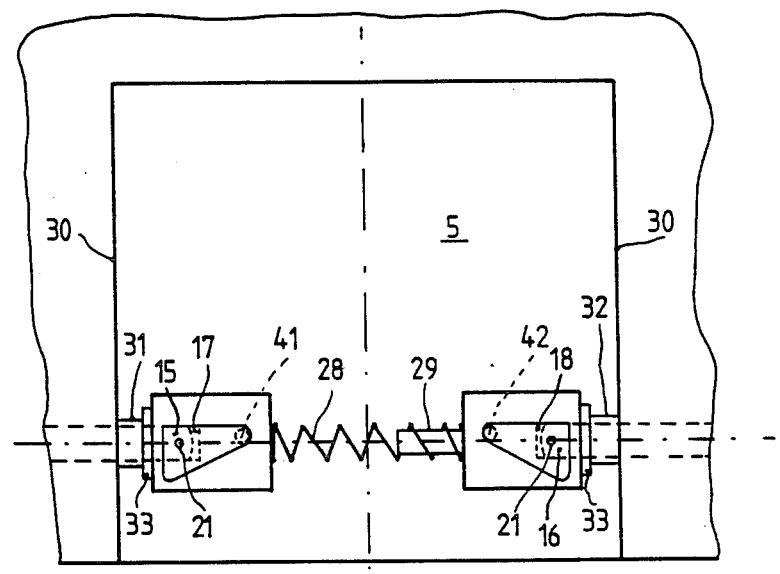
FIG. 4 shows a detail of the latch mechanism in the latched position, but with the pivot handle removed for representation's sake.
Figure 5:
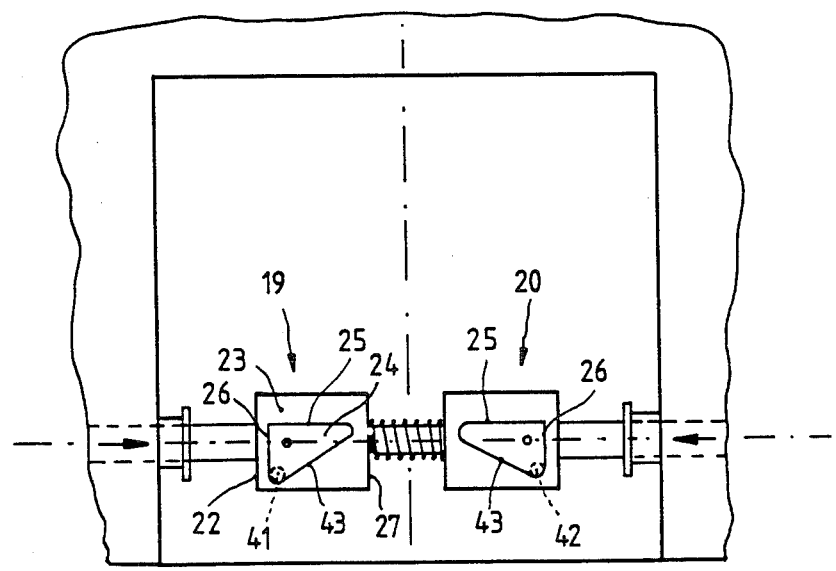
FIG. 5 shows a view according to FIG. 4, in which the latch mechanism is in the unlatched position.

The respective pins 41 and 42, spaced apart from each other on the inside 36, which said pins are engaged in the groove 24 of the cylinders 19 and 20 in the mounted state of the pivot handle 34, are disposed in line with the bearing bush 40 of the two holding cheeks 39 spaced apart from each other. The distance between the two pins 41 and 42 is such that in the relaxed state of the compression spring 28, in which state the respective cylinders 19 and 20 are in contact with the respective bearing bushes 31 and 32 according to the representation shown in FIG. 4, the said pins come to lie in the corner of the corresponding triangular groove 24 of the cylinders 19 and 20 which said groove is adjacent to the corresponding circular surfaces 27. The representation in FIG. 4 shows the pin position which would occur if the pivot handle 34 were mounted. If the pivot handle 34 is pivoted about the bearing bushes 31 and 32, the pins 41 and 42 slide on the hypotenuse 43 of the groove 24 and in their end positions, they will occupy the corner of the triangle which is adjacent to the circular surface 22. The movement of the pins 41 and 42 into this corner is only made possible by the movement of the cylinders 19 and 20 towards each other by the length of the side 25, which at the same time results in an axial movement of the locking rods 10 and 11 into the unlatched position, as is shown in FIG. 5. The position of the pins 41 and 42 was shown in this figure as well for better clarity.

Due to the form-locking connection of the pins 41 and 42 with the hypotenuse 43, the pivot movement of the pivot handle 34 is transformed into a rectilinear movement of the locking rods 10 and 11. The special triangular design of the groove guarantees that the snapping in of the cover 1 and thus the pushing back of the respective locking rods 10 and 11 do not result in the cylinders 19 and 20 producing any movement of the pivot handle 34. The reference numeral 44 designates a stop which limits the return stroke of the pivot handle 34.

DESCRIPTION OF THE SECOND EMBODIMENT

Figure 6:
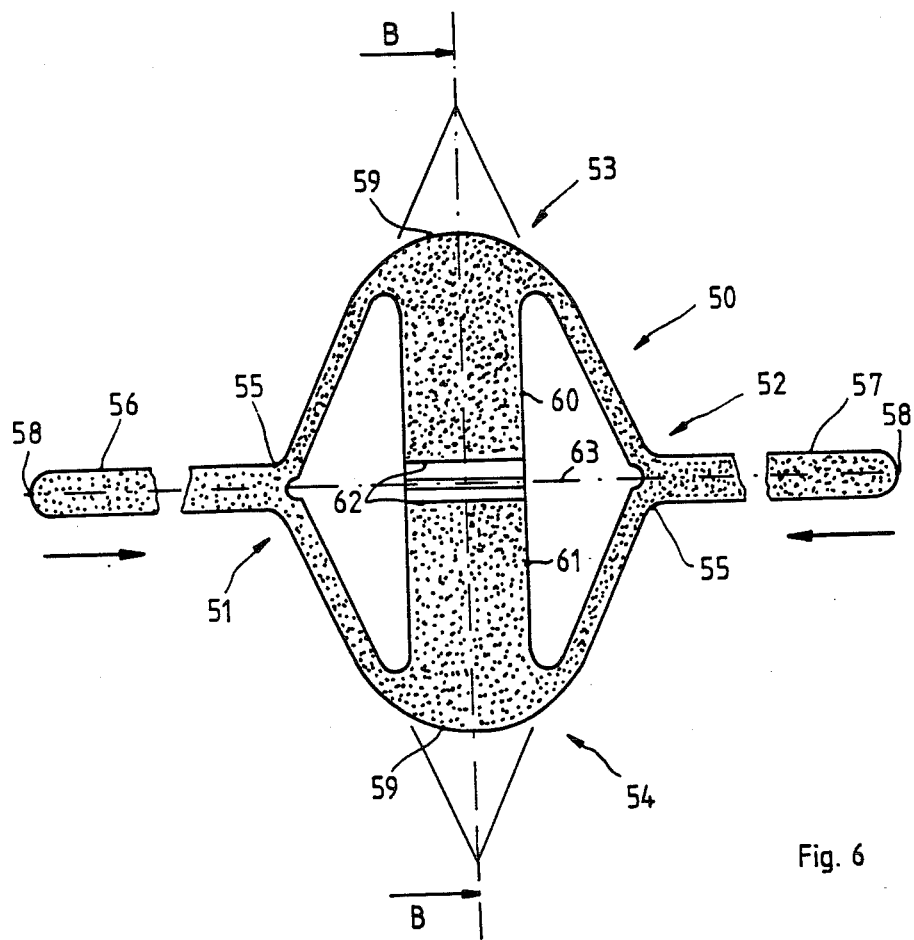
FIG. 6 shows a top view of a second embodiment of the latch mechanism according to the present invention, without detailed representation of the glove compartment cover.
Figure 7:
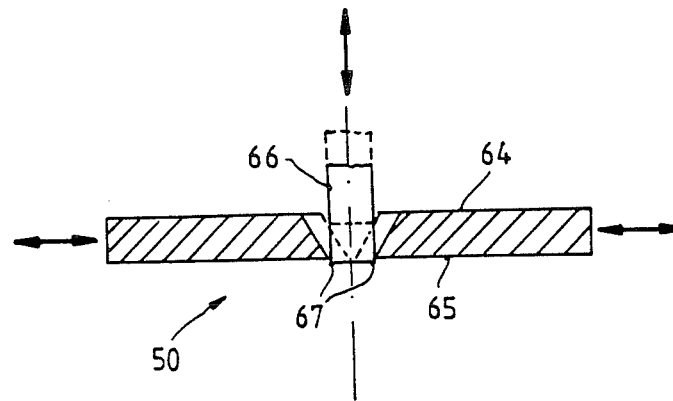
FIG. 7 shows a section through the latch mechanism according to line B—B in FIG. 6.

FIGS. 6 and 7, which pertain to the second embodiment, show an integral elastic rhomboid body 50. It has opposed wedge portions 51 and 52 as well as wedge portions 53 and 54 perpendicular to the said first wedge portions. The wedge portions 51 and 52 form a wedge angle of 130°, and the wedges 53 and 54 form a wedge angle of 50°. In the region of the tips 55 of the wedge portions 51 and 52, locking rods 56 and 57 are attached to the outside of these wedges by injection molding. The free ends 58 of the locking rods 56 and 57 can be introduced into recesses not shown in detail. In the region of the tips 59 of the wedges 53 and 54, inwardly directed pushing means 60 and 61 are attached to the inside of the wedges 53 and 54, and the pushing means 60 and 61 face each other. Their ends 62 are equidistant from the symmetry line 63 of the locking rods 56 and 57. The thickness of the pushing means 60 and 61 is a multiple of the thickness of the individual webs of the wedge portions 51 through 54.

As is apparent from the representation shown in FIG. 7, the ends 62 of the pushing means 60 and 61 are inclined, i.e., the space formed between the ends 62 tapers off conically from the upper surface 64 of the body 50 toward the lower surface 65. Perpendicular to the body 50, in the region of the space formed between the ends 62, there is disposed a square pin 66 reciprocable perpendicular to the principal direction of the pushing means 60 and 61, so that when the square 66 is depressed, its lower edges 67 come to lie against the inclined ends 62 of the pushing means 60 and 61 and the pushing means are moved apart from each other during further depression of the square 66. Due to the elastic nature of the material, the movement results in the wedge angles of the wedges 53 and 54 decreasing and consequently the wedges 51 and 52 as well as the locking rods 56 and 57 being moved towards each other, which results in unlatching of the locking rods. When the square 66 is removed again from the space formed between the ends 62, the elasticity of the body results in a movement of the pushing means 60 and 61 toward each other, whereby the locking rods 56 and 57 are extended again. The position of the pushing means 60 and 61 in the unlocked state is shown in FIG. 7 by solid lines and the position of the pushing means in the latched state is shown by dash-dotted lines. The arrangement of the body 50 on the glove compartment cover is not shown in detail. The body 50 is attached to the inside of the glove compartment cover, the locking rods 56 and 57 are guided by bearing means, the square 66 for acting on the pushing means 60 and 61 is disposed along the length of the said square in the cover and is moved by means of a control knob.

The fact that the rectilinear movement of the square 66 results in a rectilinear movement of the locking rods 56 and 57 is essential in the second embodiment of the present invention explained.

The embodiments of the invention in which an exclusive property or privilege is claimed are defined as follows:

1. A latch mechanism for the hingedly mounted glove compartment cover of a vehicle glove compartment comprising:

a pair of latching members reciprocably mounted in the glove compartment cover, each latching member having a locking rod at the outer end thereof adapted for introduction into a recess in the glove compartment to latch the door in the closed position, and each latching member having at the inner end thereof a cylindrical surface with a right-angled triangular shaped groove at the inner end thereof having walls which are perpendicular to each other respectively arranged parallel and perpendicular to the longitudinal axis of the locking rod and the wall perpendicular to the longitudinal axis of the locking rod located toward the outer end of the locking rod; and a handle pivotable about a bearing axis disposed on the cover and in parallel relationship with the pivot axis of the cover, said handle having a pair of transmission elements which extend respectively into the triangular grooves of the latching members whereby pivotal movement of the handle causes the transmission elements to be displaced in a path perpendicular to the axis of the locking members so that the transmission elements coact with the walls of the grooves to translate the latching members in and out of the recesses of the glove compartment.

2. The latch mechanism of claim 1 further characterized by compression spring means acting between the latching members to urge the latching members apart from one another for introduction of the locking rods into the recess in the glove compartment to normally latch the door in the closed position.

3. The latch mechanism of claim 1 or 2 in which the handle is pivotable about a bearing axis which is coaxial with the longitudinal axis of the locking members.

* * * * *